United States Patent
Liu

[11] Patent Number: 5,980,428
[45] Date of Patent: Nov. 9, 1999

[54] VEHICLE LAUNCH AUTOMATED MASTER CLUTCH CONTROL

[75] Inventor: Chia-Hsiang Liu, Northville, Mich.

[73] Assignee: Eaton Corporation, Cleveland, Ohio

[21] Appl. No.: 09/197,544

[22] Filed: Nov. 13, 1998

[51] Int. Cl.$^6$ .......................... B60K 23/02; F16D 43/22
[52] U.S. Cl. ........................ 477/180; 477/175; 477/174
[58] Field of Search .................................. 477/169, 174, 477/175, 180, 74

[56] References Cited

U.S. PATENT DOCUMENTS

| | | | |
|---|---|---|---|
| 4,081,065 | 3/1978 | Smyth et al. | 192/0.076 |
| 4,361,060 | 11/1982 | Smyth | 74/866 |
| 4,595,986 | 6/1986 | Daubenspeck | 364/424.1 |
| 4,646,891 | 3/1987 | Braun | 192/0.032 |
| 4,700,823 | 10/1987 | Winckler | 192/107 |
| 4,792,027 | 12/1988 | Ohkumo | 477/180 X |
| 4,860,861 | 8/1989 | Gooch et al. | 192/3.26 |
| 4,969,545 | 11/1990 | Hayashi | 477/180 X |
| 5,275,267 | 1/1994 | Slicker | 192/0.033 |
| 5,293,316 | 3/1994 | Slicker | 364/424.1 |
| 5,314,050 | 5/1994 | Slicker et al. | 477/171 |
| 5,337,868 | 8/1994 | Liu et al. | 477/74 |
| 5,337,874 | 8/1994 | Oltean et al. | 192/111 |
| 5,383,823 | 1/1995 | Ward et al. | 447/86 |
| 5,393,274 | 2/1995 | Smedley | 477/74 |
| 5,403,250 | 4/1995 | Juergens | 477/180 X |
| 5,404,301 | 4/1995 | Slicker | 364/424.1 |
| 5,411,124 | 5/1995 | Olson | 192/103 |
| 5,441,137 | 8/1995 | Organek et al. | 192/35 |
| 5,485,903 | 1/1996 | Organek et al. | 192/35 |
| 5,509,867 | 4/1996 | Genise | 477/120 |
| 5,624,350 | 4/1997 | Bates | 477/78 |
| 5,628,706 | 5/1997 | Zhang | 477/175 X |
| 5,630,773 | 5/1997 | Slicker et al. | 477/176 |
| 5,679,096 | 10/1997 | Stine et al. | 477/111 X |
| 5,738,609 | 4/1998 | Jones et al. | 477/175 |
| 5,752,894 | 5/1998 | Fishcer | 477/176 X |
| 5,782,710 | 7/1998 | Kosik et al. | 477/175 X |
| 5,803,869 | 9/1998 | Jamzadeh et al. | 477/175 X |
| 5,871,419 | 2/1999 | Amendt | 477/180 |

*Primary Examiner*—Khoi Q. Ta
*Attorney, Agent, or Firm*—Howard D. Gordon

[57] ABSTRACT

A launch control for a vehicle drive line (10) including a selectively engaged clutch (14) and an electronically controlled engine (12). Throttle position (THL) is sensed to determine a target engine speed ($ES_T$), the engine is commanded to achieve the target engine speed, and the clutch is engaged as a function (82) of sensed engine speed (ES), known maximum torque engine speed (84), and the known maximum engine torque (80) at the sensed engine speed.

19 Claims, 6 Drawing Sheets

VEHICLE LAUNCH AUTOMATED MASTER CLUTCH CONTROL

RELATED APPLICATIONS

This application is related to the following applications, all assigned to EATON CORPORATION, assignee of this application:

Ser. No. 09/189,995 [98-rTRN-398] entitled TOUCH POINT IDENTIFICATION FOR VEHICLE MASTER CLUTCH filed Nov. 12, 1998, Ser. No. 09/195,093 [98-rTRN-400] entitled IDLE DRIVE TORQUE CONTROL FOR AUTOMATED VEHICLE MASTER CLUTCH filed Nov. 18, 1998.

BACKGROUND OF THE INVENTION

1. Field of the Invention

The present invention relates to controls for vehicular master clutches, preferably wet friction clutches, utilized in partially or fully automated mechanical transmission systems. In particular, the present invention relates to a control system/method for controlling the vehicle master clutch during a vehicle launch operation.

2. Description of the Prior Art

Partially and fully automated vehicular mechanical transmission systems utilizing friction master clutches are known in the prior art, as may be seen by reference to U.S. Pat. Nos. 4,361,060; 4,595,986; 4,850,236; 4,648,290; 5,389,053; 5,487,004; 5,487,005 and 5,509,867, the disclosures of which are incorporated herein by reference.

Controls for automated friction master clutches, usually dry friction clutches, utilized in vehicular automated transmission systems are known, as may be seen by reference to U.S. Pat. Nos. 4,081,065; 4,646,891; 4,860,861; 5,275,267; 5,293,316; 5,314,050; 5,337,868; 5,337,874; 5,383,823; 5,393,274; 5,411,124; 5,404,301; 5,630,773; 5,624,350 and 5,738,609, the disclosures of which are incorporated herein by reference.

SUMMARY OF THE INVENTION

According to the present invention, a control for an automated master friction clutch, such as a wet friction clutch, is provided which utilizes the information available on industry standard vehicular data links, such as data links conforming to the SAE J1922, SAE J1939 and/or ISO 11898 protocols, to provide improved clutch control and clutch functional features as compared to the prior art.

During vehicle launch, the clutch is engaged at a torque capacity which is a function of engine maximum torque at a sensed engine speed determined by throttle pedal position. This will result in minimizing lugging of the engine.

This and other objects and advantages of the present invention will become apparent from a reading of the following description of the preferred embodiment taken in connection with the attached drawings.

DESCRIPTION OF THE PREFERRED EMBODIMENT

Figure 1:
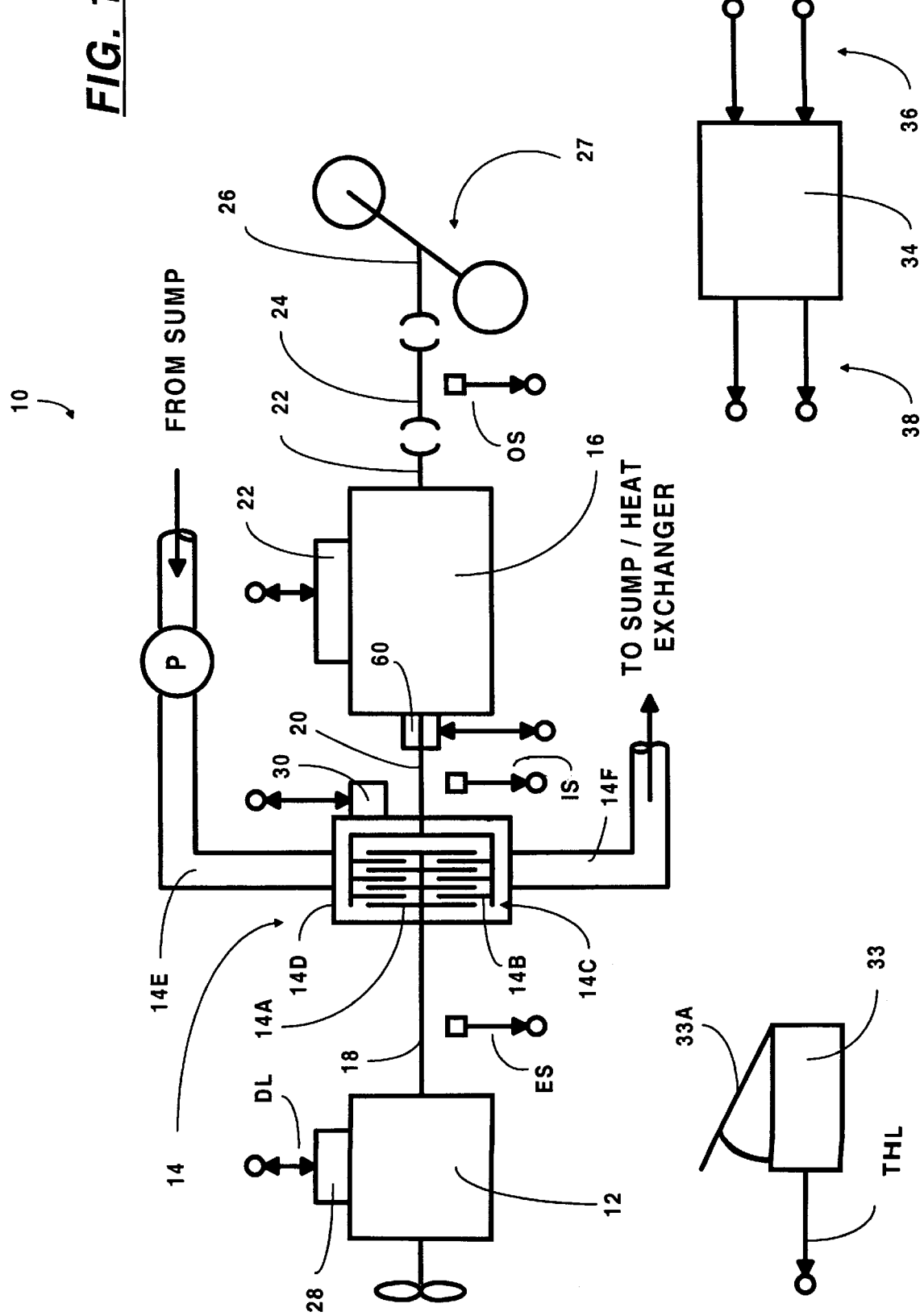
FIG. 1 is a schematic illustration of a vehicular automated mechanical transmission system advantageously utilizing the vehicle launch master clutch control of the present invention.

A vehicular automated mechanical transmission system 10 advantageously utilizing the vehicle launch master clutch control of the present invention is schematically illustrated in FIG. 1.

System 10 includes a fuel-controlled engine 12, a wet master friction clutch 14 and a multiple-speed mechanical transmission 16. Engine 12 is typically a diesel or gasoline engine and has an output member or crank shaft 18 which drives friction discs 14A of clutch 14, which are interdigitated with friction discs 14B, rotationally fixed to input shaft 20 of transmission 16.

Transmission 16 may be of the simple or compound type, as illustrated in U.S. Pat. No. 5,370,561, the disclosure of which is incorporated herein by reference. Transmission 16 has an output shaft 22, which drives a drive shaft 24 connected to the input 26 of a vehicle drive axle mechanism 27.

An engine controller 28, which is preferably electronically and microprocessor-controlled, is provided for controlling fueling of the engine and for providing output information to an electronic data link DL, preferably conforming to the industry standard SAE J1939 or a comparable protocol. System 10 also includes a clutch actuator 30 for controlling operation of clutch 14 and a transmission actuator 32 for controlling operation of transmission 16. A sensor 33 is provided for sensing throttle position and providing a signal THL indicative thereof.

Electronic engines controlled by an SAE J1939 or similar data link typically have four modes of operation, (i) fuel according to throttle position, (ii) fuel according to requested engien speed, (iii) fuel according to requested gross engine torque, and (iv) fuel according to requested engine speed and gross engine torque.

A microprocessor-based control unit 34 is provided for receiving input signals 36 and processing same according to control logic to generate command output signals 38 to the system actuators. The ECU may be separate or integral with the engine controller. The various controllers, sensors and/or actuators may communicate over a data link conforming to an industry standard protocol, such as SAE J1939 or the like.

Suitable sensors, such as sensors for sensing engine speed ES, input shaft speed IS and/or output shaft speed OS, and actuators are known to those of ordinary skill in the art and examples thereof, not intended to be limiting, may be seen by reference to U.S. Pat. Nos. 4,361,060; 4,873,881; 4,974,468; 5,135,218; 5,279,172; 5,305,240; 5,323,669; 5,408,898; 5,441,137; 5,445,126; 5,448,483 and 5,481,170.

Clutch 14 is defined as a "wet clutch," as the friction members thereof, 14A and 14B, are exposed to liquid, such as a synthetic such as Dextron III or the like, for heat transfer and/or lubrication purposes. In the illustrated embodiment, the clutch pack 14C is contained within a housing 14D, which is connected to source conduit 14E and an exhaust conduit 14F. While a forced coolant system is illustrated, the present invention also is applicable to wet clutches wherein the friction members are in a relatively static sump or the like. While the illustrated preferred embodiment utilizes a multidisc wet clutch 14, the present invention also is applicable to single-disc wet clutches and/or dry clutches.

As is known (see aforementioned U.S. Pat. No. 5,509, 867), a data link conforming to the SAE J1939 protocol or a comparable protocol, transmits information by which engine output torque (also called "flywheel torque") may be read or determined. These data links also allow a command to the engine to adjust fueling such that a particular engine speed and/or a particular engine torque is achieved. By utilizing this information and engine control capability, the master clutch 14 may be controlled to provide enhanced system performance.

Figure 2:
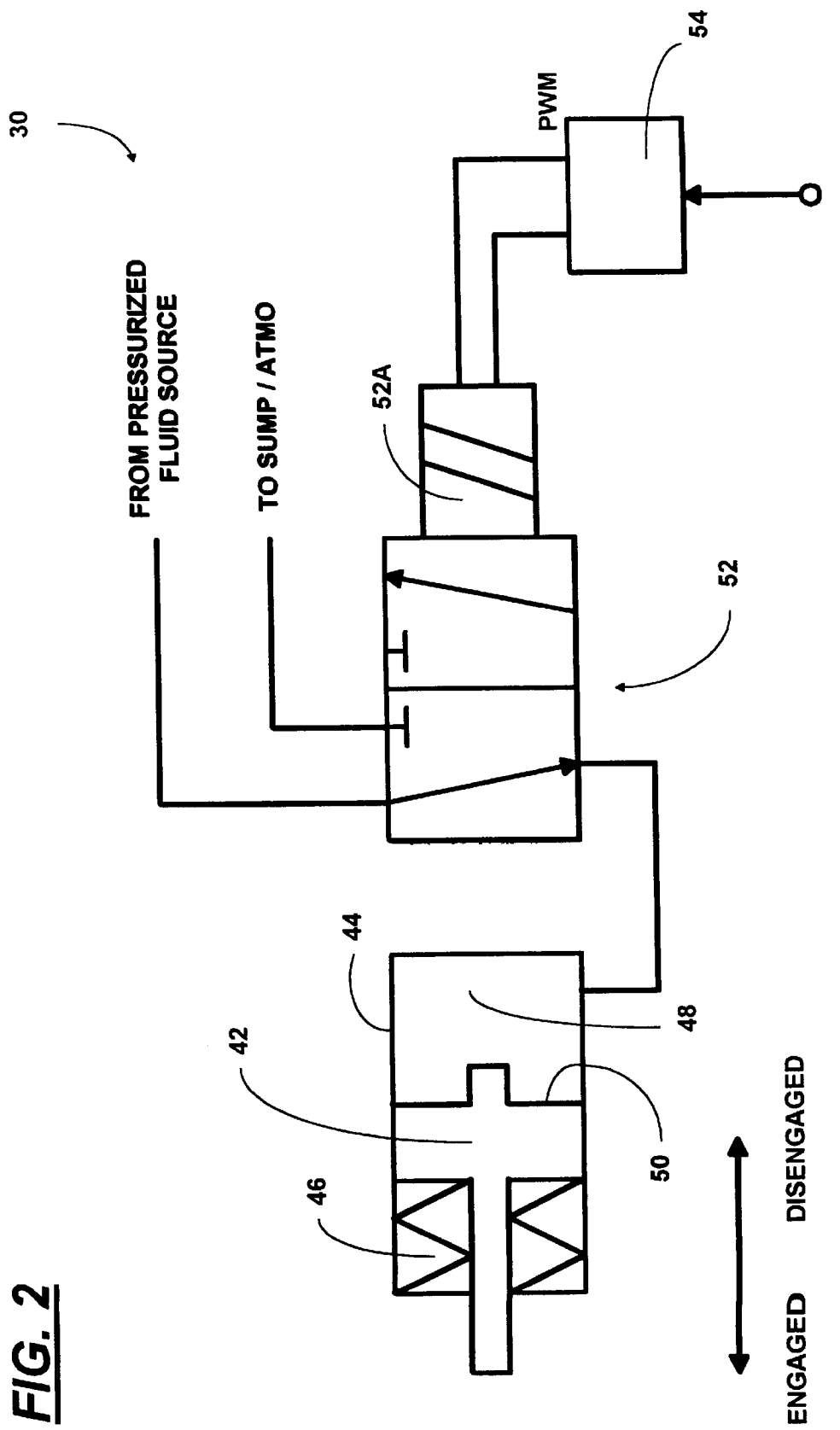
FIG. 2 is a schematic illustration of a pressurized fluid-actuated control mechanism for controlling the engaged condition of a vehicular master clutch.

A fluid pressure-operated clutch actuator assembly 30 is schematically illustrated in FIG. 2. A clutch operator piston 42 is received in a cylinder 44 and is biased in the disengaging direction by springs 46. Pressurized fluid, such as a hydraulic fluid or pressurized air, introduced into chamber 48 will act on piston face 50 to move the piston 42 in the engaged direction against the bias of the springs. A two-position, three-way, solenoid-controlled valve 52 is provided to selectively pressurize and exhaust chamber 48. A valve controller 54 responding to control signals from system controller 34 controls energizing of the solenoid 52A of valve 52, preferably by pulse width modulation (PWM).

Although a pressurized fluid-type actuator assembly 30 is illustrated, the present invention also is applicable to clutch controls using other types of clutch actuators, such as ball ramp actuators or the like (see U.S. Pat. Nos. 5,441,137 and 5,485,903, the disclosures of which are incorporated herein by reference).

The friction material of clutch discs 14A and 14B may be of standard material or may be of pyrolytic carbon, as disclosed in U.S. Pat. No. 4,700,823 or the like.

Figure 3:
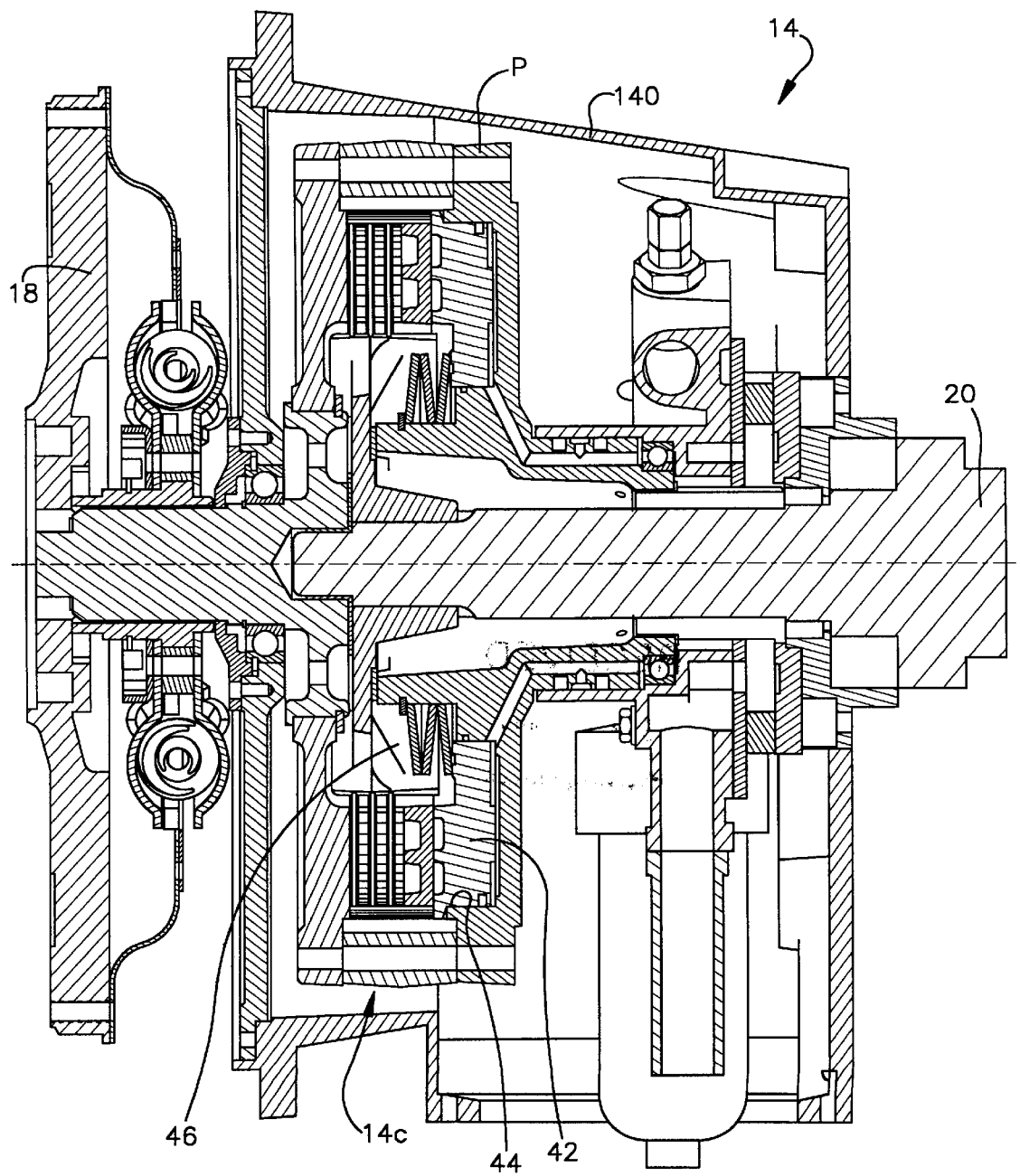
FIG. 3 is a partial sectional view of a vehicular wet master friction clutch of the type utilized in the system of FIG. 1.

The structure of a typical wet master friction clutch 14 may be seen by reference to FIG. 3. Briefly, the engine output 18, shown as a dampened flywheel, is connected to the transmission input shaft 20 by the engageable and disengageable friction disc pack 14C. The clutch is contained within a housing 14D, which will hold the lubricating and cooling fluid, such as a synthetic Dextron III or the like. Annular piston 42 is slidably and sealingly contained in a cylinder 44 and is biased in the disengaged direction by springs 46.

System 10 also may include an inertia brake, also known as an input shaft brake or upshift brake 60, for decelerating or stopping the input shaft 20 for more rapid upshifting. Inertia brakes are known, as may be seen by reference to U.S. Pat. Nos. 5,086,659 and 5,713,445.

Figure 4A:
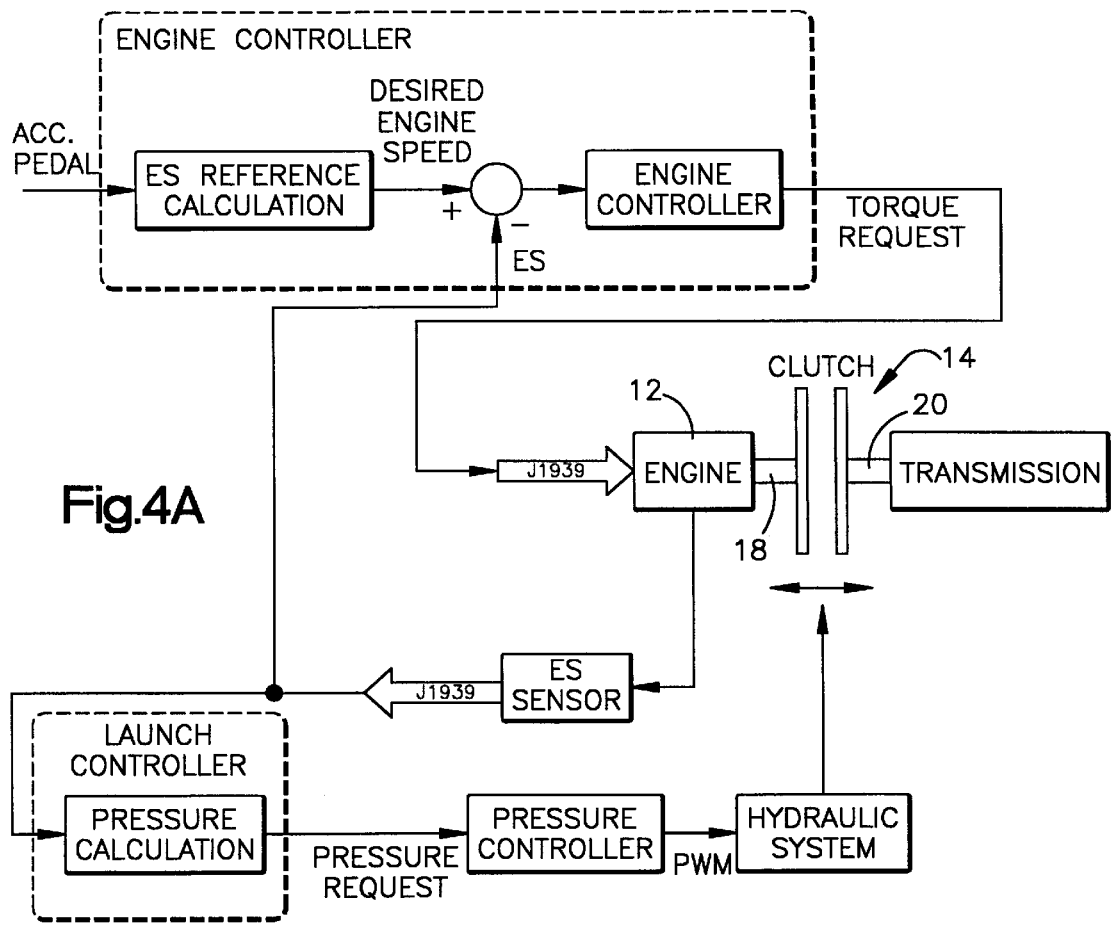
FIG. 4A is a schematic illustration of the vehicle launch master clutch control system, which includes both hardware and software (shown in shadowed blocks).

In a vehicle launch, i.e., a start-from-stop situation, it is desirable that the vehicle engine not be caused to lug because the torque required to move the load at a selected RPM exceeds the maximum available engine torque at that RPM. The torque output of a diesel engine 12 is known (see line 80 in FIG. 4). The maximum torque curve 80 information may be installed into the memory of controllers 28 and/or 34, and/or may be broadcast over the data link DL.

According to the present invention, during a vehicle launch, the clutch 14 is caused to engage to a torque capacity that will tend to cause the engine to rotate at or near the maximum torque RPM thereof. Vehicle launch conditions are typically considered to exist if vehicle speed is below a reference value and/or if engine speed is more than a predetermined RPM greater than input shaft speed. At the end of vehicle launch, the clutch 14 is fully engaged to its full torque transfer capacity.

By way of example, vehicle launch conditions may be determined to exist if vehicle speed is less than about 3–5 MPH and the throttle position is at least 1%–5%. A launch will be considered completed if engine speed exceeds a reference (about 900 RPM) and is within 5%–10% of transmission input shaft speed.

FIG. 4 depicts the entire automated clutch vehicle launch control system of the present invention, which comprises both hardware and software (shadowed blocks). The function of the engine controller is to maintain (or control) the engine speed to a desired speed. The desired engine speed is calculated by the ES reference calculation block as a function of the accelerator pedal. To engage the clutch, the pressure controller will send a command, preferably a pulse width modulated (PWM) command, to the solenoid-actuated hydraulic system, which in turn pressurizes the clutch piston 42 to engage the clutch. The engaged clutch torque is substantially proportional to the PWM command. The launch controller uses the engine speed to compute the appropriate pressure request, which is sent to the pressure controller to generate an appropriate PWM signal, that will produce a smooth vehicle launch command. There is no pressure request at idle engine speed.

When the accelerator pedal 33A is pressed, the desired engine speed increases and so does the engine speed as the result of engine control. The launch controller will then generate some pressure request, as the engine speed increases, to engage the clutch. If the engine speed slows down due to the increasing load from the clutch engagement, the engine controller will increase the torque request in response to the speed changes and, thus, balances the engine torque output and clutch load. If the clutch load is overpowering the engine output and causing the engine to be lugged down, the resulting lower engine speed will then cause the launch controller to reduce the pressure request and, thus, disengage the clutch porportionally to balance engine torque and clutch load. In any case, the torque balance is achieved automatically due to the speed feedback control.

Figure 4B:
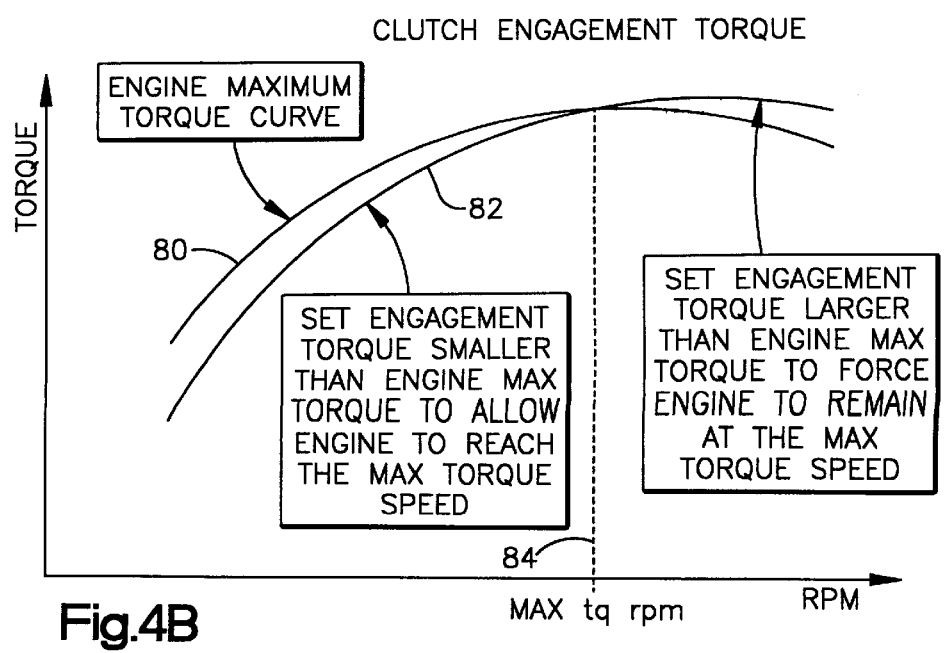
FIG. 4B is a graph illustrating maximum engine torque at engine speeds and commanded clutch engagement torque at engine speeds.

To insure smooth vehicle start without causing engine lug down and also utilize all available engine torque, the launch controller should be programmed to generate the pressure request (see line 82) such that the relation between the resulting clutch torque and engine speed is similar to that shown in FIG. 4B. This arrangement would allow the engine to accelerate to its maximum torque RPM and remain at this speed during a heavily loaded startup.

If the requested engine speed (in direct porportion to throttle signal THL) is less than the maximum engine torque RPM (i.e., to the left of line 84 in FIG. 4A), then the clutch will be engaged to a torque capacity less than the engine maximum torque at that RPM. If the requested engine speed is greater than the maximum engine torque RPM (i.e., to the right of line 84 in FIG. 4A), then the clutch will be engaged to a torque capacity greater than the engine maximum torque at that RPM.

Figure 5:
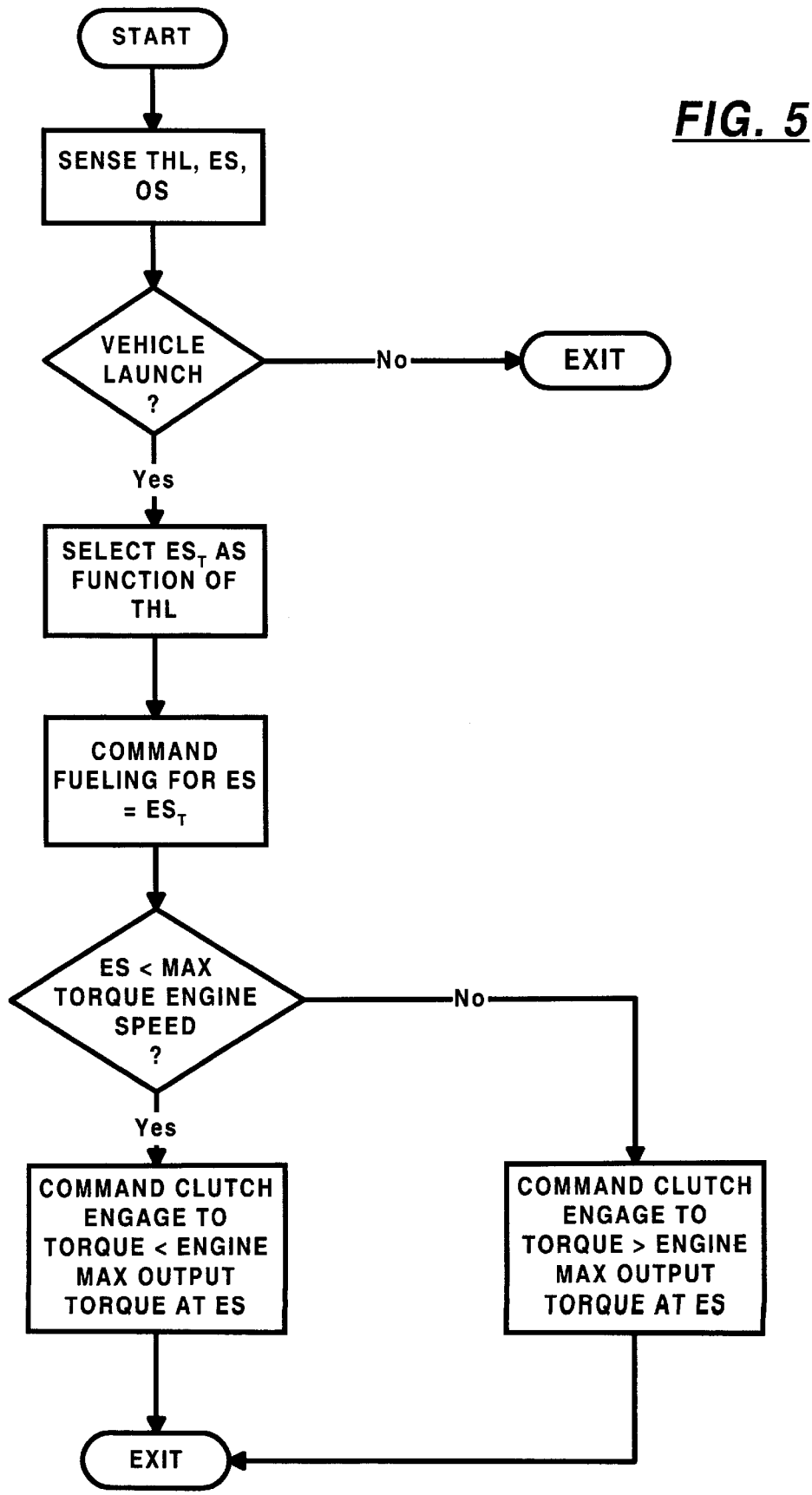
FIG. 5 is a schematic illustration, in flow chart format, of the vehicle launch master clutch control logic of the present invention.
Figure 6:
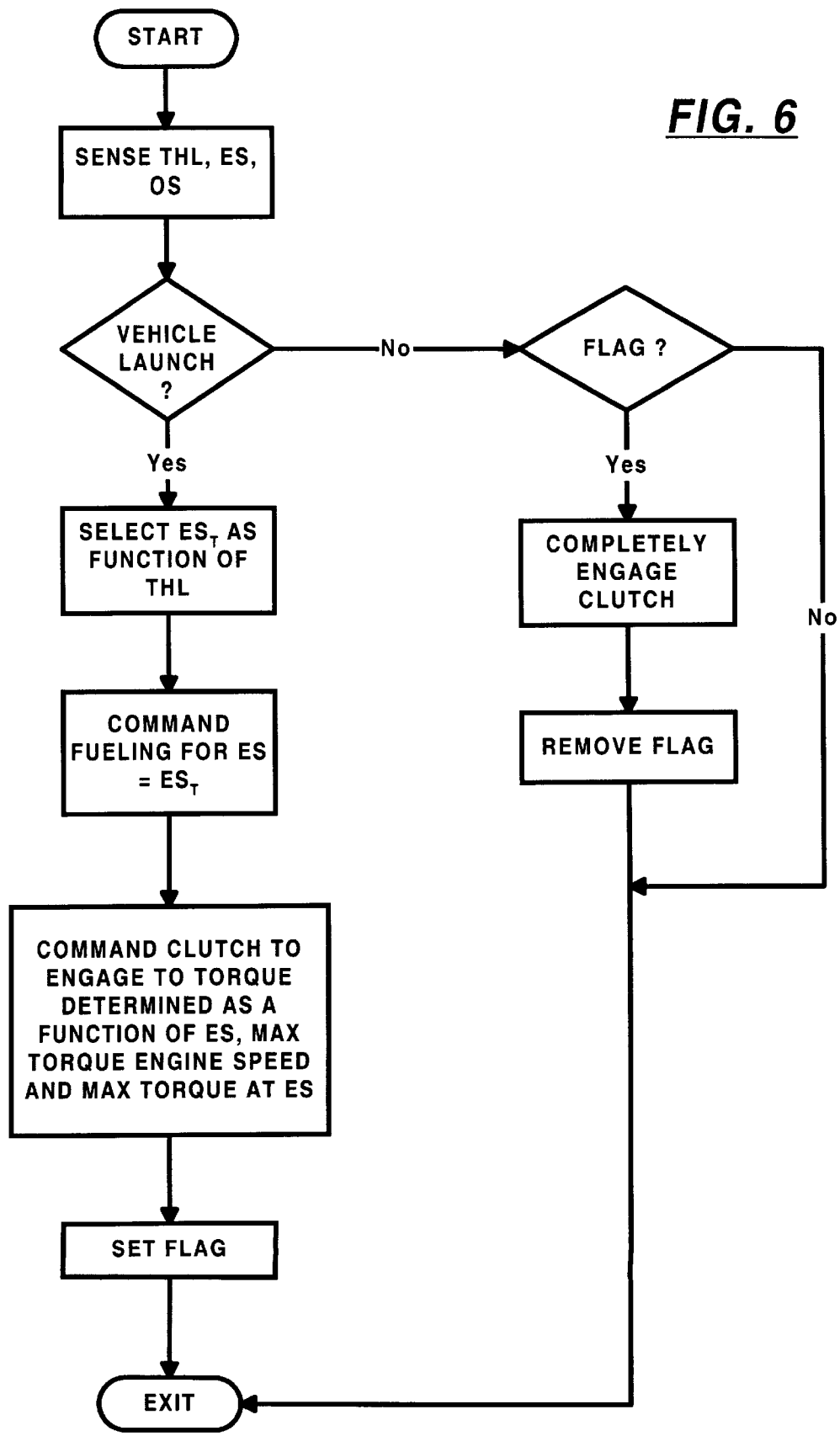
FIG. 6 is a schematic illustration, in flow chart format, of an alternate clutch control logic.

FIGS. 5 and 6 are flow chart representations of alternate clutch control logic according to the present invention.

Accordingly, by utilizing the feedback and control available with an SAE J1939-type data link, a vehicle launch clutch control strategy is provided for smooth vehicle start utilizing, if required, a maximum of available engine torque.

Accordingly, it may be seen that a new and improved vehicle launch master clutch control system/method is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling a vehicular drive line system including a fuel-controlled engine having an output member, said fuel-controlled engine having a known maximum output torque (80) at various engine speeds and a known maximum torque engine speed (84) at which engine output torque is greatest, a multiple-speed, change-gear transmission having an input shaft drivingly coupled to said output member by a master friction clutch, a clutch operator for selectively engaging and disengaging said clutch to provide a selected torque transfer capacity (82) from said output member to said input shaft, an operator-set throttle device for manual requesting of fuel supply to said engine, an engine controller for controlling fueling of said engine, said controller effective to fuel said engine to cause said engine to rotate at a selected engine speed, a system controller for receiving input signals including signals indicative of (i) displacement of said throttle device (THL), (ii) speed of said vehicle (OS), and (iii) engine speed (ES), and for processing same according to logic rules to issue command output signals to system actuators including said clutch operator and said engine controller, said method characterized by, when vehicle launch conditions are determined to exist:

sensing displacement of said throttle device and determining a desired engine speed as a function of sensed displacement of said throttle device;

commanding said engine controller to fuel said engine to cause said engine to rotate at said desired engine speed; and sensing engine speed and causing said clutch operator to cause said clutch to be engaged at a selected torque transfer capacity, said torque transfer capacity (82) being (i) less than the engine maximum output torque at sensed engine speed if sensed engine speed is less than said maximum torque engine speed (84), and (ii) greater than the engine maximum output torque at sensed engine speed if sensed engine speed is greater than said maximum torque engine speed.

2. The method of claim 1 further comprising sensing completion of a vehicle launch operation and then causing said clutch to be fully engaged.

3. The method of claim 1 wherein said clutch is a liquid-cooled wet clutch.

4. The method of claim 1 wherein said system controller is microprocessor-based and said engine controller communicates with an electronic data link conforming to the protocols of one of SAE J1922, SAE J1939 or ISO 11898.

5. The method of claim 1 wherein vehicle launch conditions are determined to exist if vehicle speed is less than a vehicle speed reference value and throttle position is greater than a throttle reference value.

6. The method of claim 5 wherein said throttle reference value is zero throttle displacement.

7. A vehicular drive line system including a fuel-controlled engine having an output member, said fuel-controlled engine having a known maximum output torque (80) at various engine speeds and a known maximum torque engine speed (84) at which engine output torque is greatest, a multiple-speed, change-gear transmission having an input shaft drivingly coupled to said output member by a master friction clutch, a clutch operator for selectively engaging and disengaging said clutch to provide a selected torque transfer capacity (82) from said output member to said input shaft, an operator-set throttle device for manual requesting of fuel supply to said engine, an engine controller for controlling fueling of said engine, said controller effective to fuel said engine to cause said engine to rotate at a selected engine speed, a system controller for receiving input signals including signals indicative of (i) displacement of said throttle device (THL), (ii) speed of said vehicle (OS), and (iii) engine speed (ES), and for processing same according to logic rules to issue command output signals to system actuators including said clutch operator and said engine controller, said system characterized by said logic rules including rules, when vehicle launch conditions are determined to exist, for:

sensing displacement of said throttle device and determining a desired engine speed as a function of sensed displacement of said throttle device;

commanding said engine controller to fuel said engine to cause said engine to rotate at said desired engine speed; and sensing engine speed and causing said clutch operator to cause said clutch to be engaged at a selected torque transfer capacity, said torque transfer capacity (82) being (i) less than the engine maximum output torque at sensed engine speed if sensed engine speed is less than said maximum torque engine speed (84), and (ii) greater than the engine maximum output torque at sensed engine speed if sensed engine speed is greater than said maximum torque engine speed.

8. The system of claim 7 wherein said logic rules further comprise rules for sensing completion of a vehicle launch operation and then causing said clutch to be fully engaged.

9. The system of claim 7 wherein said clutch is a liquid-cooled wet clutch.

10. The system of claim 7 wherein said system controller is microprocessor-based and said engine controller communicates with an electronic data link conforming to the protocols of one of SAE J1922, SAE J1939 or ISO 11898.

11. The system of claim 7 wherein vehicle launch conditions are determined to exist if vehicle speed is less than a vehicle speed reference value and throttle position is greater than a throttle reference value.

12. The system of claim 11 wherein said throttle reference value is zero throttle displacement.

13. A method for controlling a vehicular drive line system including a fuel-controlled engine having an output member, said fuel-controlled engine having a known maximum output torque (80) at various engine speeds and a known maximum torque engine speed (84) at which engine output torque is greatest, a multiple-speed, change-gear transmission having an input shaft drivingly coupled to said output member by a master friction clutch, a clutch operator for selectively engaging and disengaging said clutch to provide a selected torque transfer capacity (82) from said output member to said input shaft, an operator-set throttle device for manual requesting of fuel supply to said engine, an engine controller for controlling fueling of said engine, said controller effective to fuel said engine to cause said engine to rotate at a selected engine speed, a system controller for receiving input signals including signals indicative of (i) displacement of said throttle device (THL), (ii) speed of said vehicle (OS), and (iii) engine speed (ES), and for processing same according to logic rules to issue command output signals to system actuators including said clutch operator and said engine controller, said method characterized by, when vehicle launch conditions are determined to exist:

sensing displacement of said throttle device and determining a desired engine speed as a function of sensed displacement of said throttle device;

commanding said engine controller to fuel said engine to cause said engine to rotate at said desired engine speed; and sensing engine speed and causing said clutch operator to cause said clutch to be engaged at a selected torque transfer capacity, said torque transfer capacity (82) being determined as a function of engine speed and known maximum engine torque at the engine speed.

14. The method of claim 13 wherein said torque capacity (82) is also determined as a function of known maximum torque engine speed (84).

15. The method of claim 14 further comprising sensing completion of a vehicle launch operation and then causing said clutch to be fully engaged.

16. The method of claim 14 wherein said clutch is a liquid-cooled wet clutch.

17. The method of claim 14 wherein said system controller is microprocessor-based and said engine controller communicates with an electronic data link conforming to the protocols of one of SAE J1922, SAE J1939 or ISO 11898.

18. The method of claim 14 wherein vehicle launch conditions are determined to exist if vehicle speed is less than a vehicle speed reference value and throttle position is greater than a throttle reference value.

19. The method of claim 18 wherein said throttle reference value is zero throttle displacement.

* * * * *